Sept. 1, 1931.    W. E. HUMPHREY    1,821,470
BEAD FORMING MECHANISM
Filed Aug. 7, 1926    2 Sheets-Sheet 1
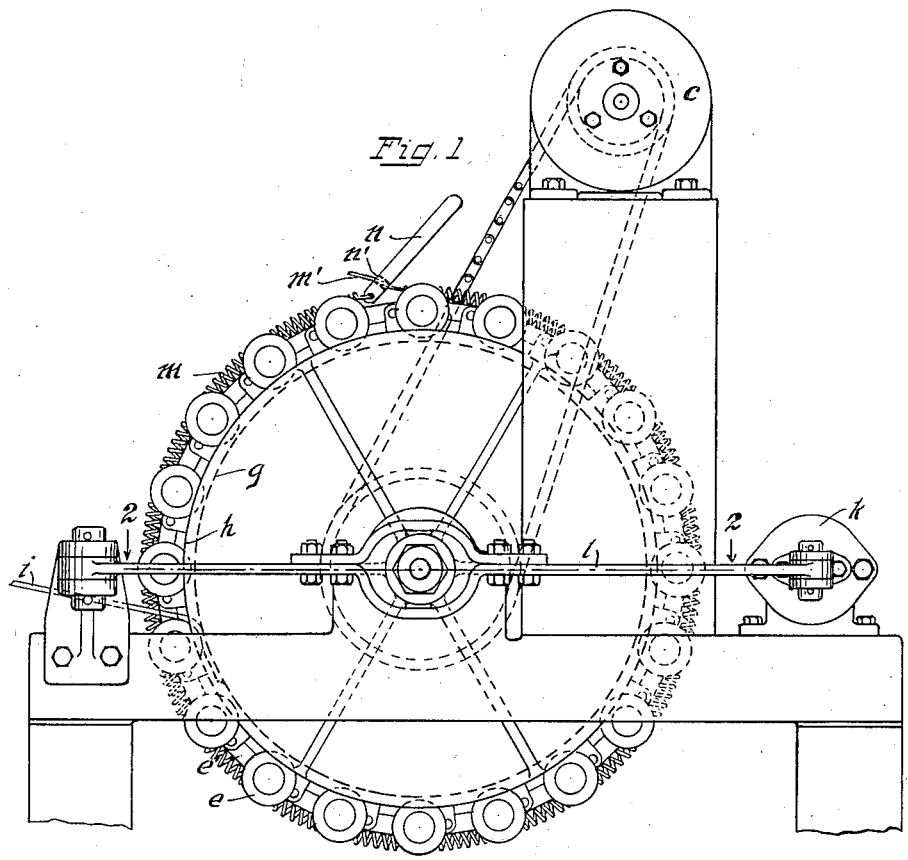
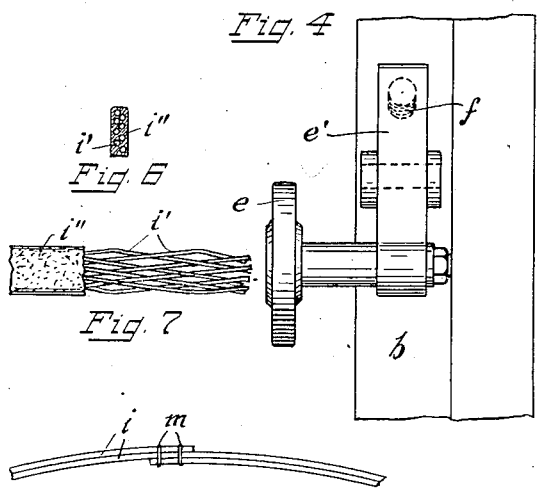
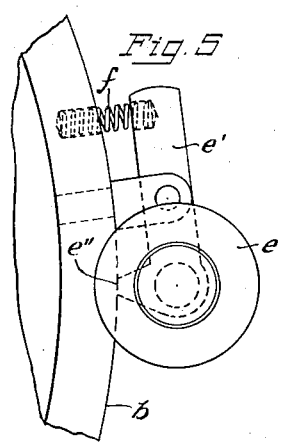
Inventor,
Walter E. Humphrey
by
Attorney.

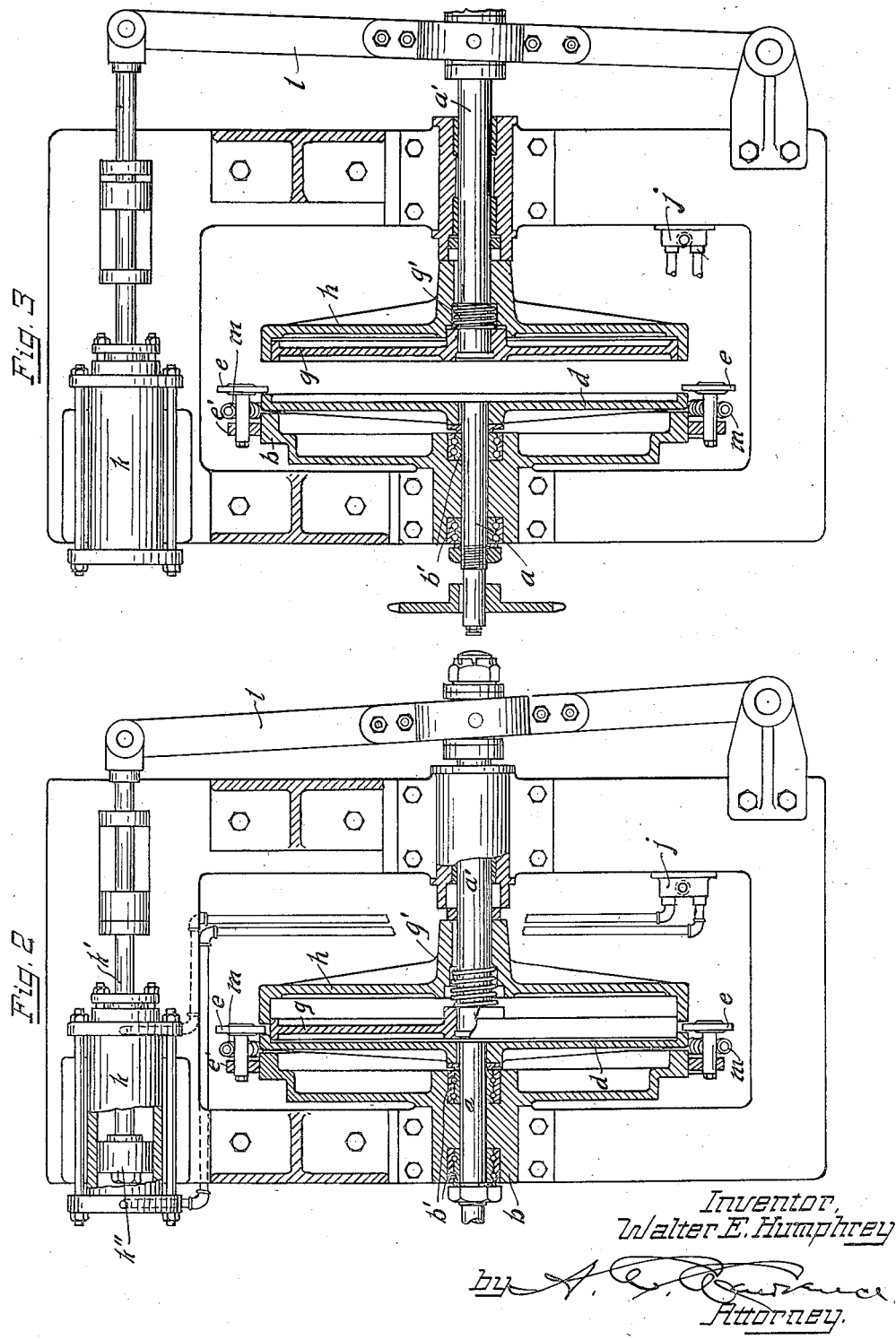

Patented Sept. 1, 1931

1,821,470

UNITED STATES PATENT OFFICE

WALTER E. HUMPHREY, OF KENT, OHIO, ASSIGNOR TO THE MASON TIRE & RUBBER CORPORATION, OF KENT, OHIO, A CORPORATION OF DELAWARE

BEAD FORMING MECHANISM

Application filed August 7, 1926. Serial No. 127,957.

My invention relates to improvements in bead-forming mechanism, and has for its object the provision of an appliance which will rapidly and satisfactorily form the beads for pneumatic tires from the uncured bead-forming strips or material.

Hitherto the bead-forming material, when shaped into the form of annular beads of two or more plies, required expert manual handling and attention in order to prevent the displacement of the soft rubber "insulation" or covering for the wires. In the preferred form, these beads are constructed ot a band of interwoven or braided wires throughout and about which an enclosing body of soft raw rubber is provided, which requires great care in its initial handling, in order to avoid disrupting or placing the rubber and exposing the wires.

Accordingly, it has been my present purpose to construct an appliance which will rapidly shape two or more plies of bead-forming material into an annular bead by exerting graduated and uniformly distributed pressure upon the treated material, as well as affording means for immediately ejecting the completed annulus from the machine. My improved mechanism affords separable means for winding the bead-forming strip upon a mandrel or drum, while peripherally disposed spring-pressed rollers bear lightly upon the rotated strip and drum to conform said strip to the circumference of the drum in overlapping plies. Preferably, pneumatic means are provided for separating the members axially and for stripping the bead from the drum immediately upon its formation. The details of said mechanism, and the preferred mode of operation may best be explained in connection with the accompanying drawings, wherein:

Figure 1 is a view of bead-forming mechanism embodying my invention, shown in end elevation;

Fig. 2 is a transverse section thereof on line 2—2, Fig. 1, showing the parts in position to receive the strip of bead-forming material;

Fig. 3 is a similar section, showing the parts in position at the completion of forming a bead;

Fig. 4 is a fragmentary detail in plan view, and Fig. 5, another fragmentary detail in side elevation, both showing one of the spring-pressed rollers;

Fig. 6 is a cross sectional view, and Fig. 7 is a plan view, partially broken away, both illustrating the bead-forming material preferably used herein, and Fig. 8 is a fragmentary view of the multiple-ply annular bead.

Throughout the several figures of the drawings I have employed the same character of reference to indicate similar parts.

Referring first to Figure 2 of the drawings, the several members of the bead-forming mechanism are shown in their initial position to receive a strip of the material, preferably cut of predetermined length. It will be seen that the rotatable parts are mounted respectively upon the shafts $a$ and $a'$ to have a common axis. The circular frame $b$ affords ball-bearings $b'$ for the shaft $a$, which is driven by the motor $c$ (Fig. 1). A dished disk $d$ is mounted freely to turn adjacent to said casing upon the end of shaft $a$.

Peripherally of the casing or frame $b$ there are mounted some twenty sets of spring-actuated rollers $e$, shown in enlarged detail, Figs. 4 and 5. Each roller is mounted upon a pivoted arm $e'$, provided adjacent to the end opposite the roller with a lightly tensioned spring $f$ which normally presses the stop $e''$ against the outer rim of casing $b$. However, these rollers are so positioned and tensioned as to bear upon the inserted strip of the bead-forming material in order to give it annular form, when inserted within the mechanism, as will be explained later in this specification.

The disk $g$, whereon the bead is adapted to be formed, is forced by its spring $g'$ normally into engagement with the disk $d$, interiorly shaped to accommodate the same; rotary motion also being imparted to the circular casing $h$, forming a stripper for the disk $g$ when the parts are retracted to the position of Fig. 3. It will be seen that these members are mounted upon the shaft $a'$ and freely rotatable when contacting with member $d$, for the purpose of winding two or more plies of the bead-forming material $i$ upon the mandrel or drum $g$.

The preferred type of such bead-forming material is shown in Figs. 6 and 7, comprising a plurality of braided or interwoven wires $i''$, completely covered and embedded within a ribbonlike mass of rubber $i'''$, applied while hot in an "insulator" or "tuber", after the manner of applying the insulating rubber covering for electrical conductors. Rubber in this condition, however, is very readily displaced and disrupted, hence my improved mechanism is designed and adapted to exert only sufficient pressure required for giving annular form to the strip and obtaining a certain degree of cohesion between the different plies.

This bead-forming material $i$, cut to the length necessary for forming a multiple-ply bead, is introduced tangentially between one of the rollers $e$ and the rotated disk or drum $g$, whereon it immediately is given annular shape, say of two plies of material, the inner and outer ends thereof being slightly overlapping, as indicated in Fig. 8. The attendant immediately throws the controlling valve $j$ to direct air under pressure into the cylinder $h$ at the left of piston $k'$, thereby outwardly forcing the plunger $k''$ and, through the medium of lever $l$, connected at the end of shaft $a'$, said shaft and the members mounted thereon are moved toward the right, thereby stripping the newly formed bead from the drum, whence it drops beneath the machine. The overlapping ends of the bead are secured by embracing staples $m$ or equivalent means until vulcanization takes place.

Immediately the bead has been stripped from its mandrel or disk $g$, the valve $j$ is reversed, so that the air is admitted upon the right of the piston, and the parts of my improved mechanism are at once restored to the position of Fig. 2, ready to receive and form another length of the bead-forming material. While the operation of this mechanism is rapid and highly efficient, the multiple spring-pressed rollers do not disrupt the soft rubber covering of the wires, which is compressed sufficiently only to insure the cohesion of the fresh rubber faces as they are rolled into contact with each other. Only one attendant is required for operating this mechanism, which is simple and unlikely to get out of order.

It has been found, when operating with relatively stiff bead-forming material that the individual springs $f$ associated with the peripheral rollers $e$ may not accurately conform the inner diameter of the completed bead to the mandrel $g$, so that the annulus resulting is oversize. Moreover, much the same result takes place, and in fact, contributes to the above mentioned tendency, when the centrifugal force of the rapidly rotated annulus is sufficient partially to overcome the tension of the individual springs, an oversize bead is likely to result.

Accordingly, it frequently is desirable to provide adjustable means, not only for the purpose of overcoming the resiliency of the wires and centrifugal force, but also to insure better cohesion of the different plies of bead-forming material, whereby the resilient pressure of the rollers may be regulated as a whole. Referring particularly to Fig. 1, it will be seen that there is further provided an encircling spiral spring $m$ which presses inwardly upon all of the rollers and variably augments their tension. The adjustment may be accomplished in any convenient manner, as by the clamp $n$ bored with a slightly oversize openings $n'$ adapted adjustably to retain the end $m'$ of the spiral spring, whereby its tension may be regulated in accordance with instant working conditions, from time to time.

Thus my improved mechanism is seen to be capable of producing beads of uniform quality and diameter with great rapidity and economy.

Having now described mechanism embodying my invention, its mode of operation, and principal advantages and utility in the art, I claim as new, and desire to secure by Letters Patent, together with such modifications as may be made by those skilled in the art, the following:

1. In mechanism of the class described, the combination with a rotatable mandrel, of means peripherally associated therewith for resiliently applying pressure radially to material wound upon said mandrel, and associated mechanism for stripping the annulus from the mandrel, substantially as set forth.

2. In mechanism of the class described, the combination with a rotatably mounted circular form, of a plurality of pressure-members radially disposed at intervals about said member, and a stripping device associated with said member, adapted to force an annulus laterally thereof and free of said mechanism, substantially as set forth.

3. In mechanism of the class described, the combination with a rotatably mounted mandrel, of a plurality of pressure-members disposed at intervals peripherally about said mandrel, resilient mountings therefor, and means for stripping an annulus formed upon said mandrel, substantially as set forth.

4. In mechanism of the class described, the combination with a rotatably mounted drum and means for actuating the same, of a plurality of spring-pressed rollers disposed at short intervals about the periphery thereof, means for effecting the relative movement laterally of said drum and rollers, and means for stripping an annulus from the drum, substantially as set forth.

5. In mechanism of the class described, the combination with a rotatable mandrel, of means peripherally associated therewith for resiliently applying pressure radially to material wound upon said mandrel, cooperating means for uniformly regulating said pressure, and associated mechanism for stripping an annulus from the mandrel, substantially as set forth.

6. In mechanism of the class described, the combination with a rotatably mounted mandrel, of a plurality of pressure members disposed at intervals about said mandrel, means for regulating the relative pressure exerted by said members, and means for stripping the annulus formed upon said mandrel, substantially as set forth.

7. In mechanism of the class described, the combination with a rotatably mounted mandrel, and means for rotating it, of a plurality of spring-pressed rollers disposed at short intervals about the periphery thereof, means for regulating the pressure exerted by said rollers, and means for effecting the stripping of an annulus as formed upon said mandrel, substantially as set forth.

8. In mechanism of the class described, the combination with a rotatable mandrel and actuating means therefor, of a plurality of spring-pressed rollers disposed at short intervals about its periphery, adjustable means for applying uniform resilient pressure to the rollers, and means for stripping the annulus when formed upon the mandrel, substantially as set forth.

9. In mechanism of the class described, the combination with a rotatably mounted circular form and means for rotating the same, of a plurality of spring-pressed rollers disposed at short intervals about its periphery and normally in its plane of rotation, stops defining the initial positions of said rollers, means for effecting the relative lateral movement of said form and rollers, and means for stripping a completed annulus from said form, substantially as set forth.

10. In mechanism of the class described, the combination with a circular mandrel, of actuating means therefor with which it is adapted normally to be brought into engagement, a plurality of spring-pressed rollers disposed at short intervals about the periphery thereof, a rotatable shaft mounting said mandrel, means for effecting the axial withdrawal of said shaft and mandrel, and mechanism for stripping a completed annulus from the mandrel in its position of withdrawal, substantially as set forth.

11. In mechanism of the class described, the combination with a driven member and means for rotating the same, of a circular form adapted intermittently to be actuated into operative engagement therewith for concurrent rotation, a plurality of spring-pressed rollers disposed at intervals about said form, a rotatable shaft mounting said form, a stripping member mounted thereon adjacent to said form, an interposed spring, and controllable means for effecting the axial withdrawal of said form from the plane of the encircling rollers and interiorly of the stripping member and for alternatively connecting it with said driven member, substantially as set forth.

12. In mechanism of the class described, the combination with a rotatable mandrel and its shaft, of means for rotating the same, a plurality of resiliently mounted rollers disposed about the periphery of the mandrel, a stripping member adjacent to said periphery, and fluid-controlled mechanism for effecting the relative movement of the mandrel and the stripping member, whereby an annulus may be forced from the mandrel substantially as set forth.

13. Ring-forming apparatus comprising a winding form, means for driving the same, a work-retaining member loosely journaled co-axially with relation to the winding form and formed with a face adapted to constitute a side wall of a work-receiving space having the winding form as its floor, the said member and the said form and their journal structures being entirely separable from each other by relative axial sliding movement, and yielding means for urging them together in driving engagement with each other.

14. Ring-forming apparatus comprising a stationary presser-roller mounting, a winding-form journaled laterally thereof and axially slidable out of association therewith, and presser-rollers mounted upon the said mounting in position to press against the winding-form strips of ring-forming material as wound thereon.

15. Ring-forming apparatus as defined in the foregoing claim, including respective work retaining members journaled on the presser-roller mounting and provided with work-engaging faces adapted to constitute side walls of an annular work-receiving space having the winding form as its floor.

16. Ring-forming apparatus comprising a winding-form, a work-retaining and dislodging member telescoped upon said form and axially slidable thereon to dislodge therefrom ring structures as wound upon the form for driving said form, and further means for actuating the work-dislodging member.

In testimony whereof I do now affix my signature.

WALTER E. HUMPHREY.